United States Patent
Cerwall et al.

(10) Patent No.: US 6,272,352 B1
(45) Date of Patent: Aug. 7, 2001

(54) METHODS FOR DETERMINING A NUMBER OF CONTROL CHANNELS IN A CELL

(75) Inventors: Carl Patrik Cerwall, Tyresö ; Anna Helleberg, Sollentuna, both of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/179,437

(22) Filed: Oct. 27, 1998

(30) Foreign Application Priority Data

Oct. 28, 1997 (SE) .................................................. 9703930

(51) Int. Cl.[7] .................................................. H04Q 7/20
(52) U.S. Cl. .......................... 455/511; 455/451; 455/452
(58) Field of Search .................................. 455/511, 509, 455/450, 451, 452, 453; 370/329, 330

(56) References Cited

U.S. PATENT DOCUMENTS

| 5,235,598 | * | 8/1993 | Sasuta ................................. 455/511 |
| 5,239,678 | | 8/1993 | Grube et al. . | |
| 5,299,198 | | 3/1994 | Kay et al. .................................. 3/16 |
| 5,513,183 | | 4/1996 | Kay et al. .................................. 3/16 |
| 5,729,534 | | 3/1998 | Jokinen et al. ........................... 7/212 |

FOREIGN PATENT DOCUMENTS

| WO 93/10600 | 5/1993 | (WO) . | |
| WO 95/19687 | 7/1995 | (WO) .................................... 7/38 |

* cited by examiner

*Primary Examiner*—Lee Nguyen
(74) *Attorney, Agent, or Firm*—Burns, Doane, Swecker & Mathis, L.L.P.

(57) ABSTRACT

Methods of reconfiguring a cell regarding the number of signaling channels in relation to the number of traffic channels. Each signaling channel (SDCCH/8) contains a number of dedicated control channels (SDCCH), wherein a number of dedicated control channels are included in a basic configuration of control channels. If the channel utilization indicates that a basic configuration of control channels is congested for more than a certain percentage of time, a dedicated control channel is added to the basic configuration. If it is determined that the basic configuration, less one control channel, is congested less than a certain percentage of time then a control channel is removed from the basic configuration.

5 Claims, 3 Drawing Sheets

METHODS FOR DETERMINING A NUMBER OF CONTROL CHANNELS IN A CELL

This application claims priority under 35 U.S.C. §§119 and/or 365 to 9703930-9 filed in Sweden on Oct. 28, 1997; the entire content of which is hereby incorporated by reference.

TECHNICAL FIELD

The present invention relates to methods of reconfigurating a cell in a cellular mobile radio system wherein each cell includes a prescribed minimum number of dedicated control channels (SDCCH) used for signalling and a number of traffic channels (TCH), where a traffic channel can be converted to a dedicated control channel and vice versa.

BACKGROUND OF THE INVENTION

It is previously known in a cellular mobile radio system to reconfigurate a cell by temporarily utilizing an empty traffic channel as a control channel.

U.S. Pat. Nos. 5,299,198 and 5,513,183 show a TDMA system in which the number of control channels can be increased by using the traffic channels (see e.g. the Abstract).

WO93/10600 discloses a method of temporarily using a traffic channel as a control channel. The decision for this is made based on comparisons of the traffic density with given threshold values (see the abstract and pages 8, lines 17 to page 9 line 9 and page 15 line 24 to page 17, line 8).

DE 31 30 176 A1 discloses a method in a cellular TDMA-system to convert traffic channels to control channels in dependence on the traffic load. More specific, in dependence on the ratio: number of time slots/number of subscribers in a cell.

SUMMARY OF THE INVENTION

The previously known techniques as e.g. mentioned above to configure the needed number of dedicated control channels, especially the signalling channels in every cell, is based on manually calculating the expected signalling traffic based on traffic models, current traffic distribution and statistics about handovers and congestion rates.

The number of signalling channels is often overdimensioned to avoid congestion. There are ways to overcome short periods of such congestion by using a traffic channel as a signalling channel. This, however, implies the use of a whole time slot instead of using only a fraction of a time slot.

Some cells carry more signalling traffic than others do. Cells at a border of a location area (LA) need more such channels than other cells. This is due to the fact that when a mobile crosses an LA border it is triggered to notify the network about its new location. This is done using a signalling channel and therefore causes heavy load on these channels. Cells with a high amount of SMS traffic do also need more signalling channels than other cells. These factors must be taken into account when dimensioning the number of signalling channels.

When there is congestion on signalling channels, new calls needing signalling channels in order to be set up may use a traffic channel i.e. a whole time slot. The congestion of signalling channels is therefore highly undesireable. This result in that an operator must over-dimension the signalling channels. However, since a cell always is given a fixed number of channels (traffic+signalling) the trade-off is fewer channels to be used as traffic channels available to carry the payload. This will seriously affect the operator's revenue. To overcome the problem with congestion on dedicated control channels, in particular the Stand Alone Dedicated Control Channel SDCCH in the GSM-system, it is allowed to use a traffic channel TCH for the signalling procedure. This will save the incoming call. However, a TCH uses a whole time slot for its configuration, while one SDCCH subchannel only uses ⅛ of it. The use of TCH for signalling is thus not desireable unless for short duration as unpredictable traffic peaks.

One object of the present invention is to meet the above mentioned problems by automatically and dynamically reconfigure a cell in a cellular mobile radio system with new or less signalling channels on demand.

Another object of the present invention is to carry out an automatic reconfiguration on a long term basis in order to take care of the fluctuations in the signalling traffic.

One advantage with the present invention as compared with prior art reconfigurations is that reconfiguration either from a traffic channel to a signalling channel or vice versa is done only in the case certain conditions are fulfilled and thus that unnecessary reconfiguration in a cell can be avoided.

Another advantage is that unnecessary reconfigurations created by the "fast loop" method mentioned below can be reduced.

BRIEF DESCRIPTION OF THE DRAWINGS

The present invention will be described in further detail with reference to the accompanying drawings, where.

DESCRIPTION OF PREFERRED EMBODIMENTS

Figure 1:
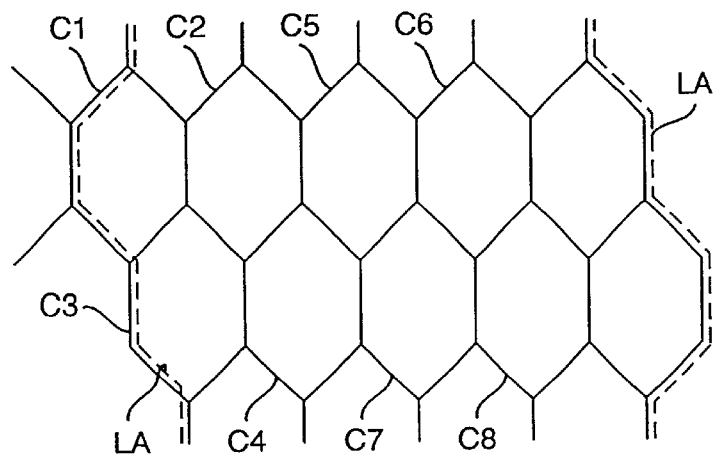
FIG. 1 shows a simplified diagram of a number of cells in a cellular mobile radio system.

FIG. 1 illustrates in general cells in a cellular mobile radio system known in the art. Each cell has a given number or set of radio channels including the traffic channels and the dedicated control channels. One or more cells can be brought together forming a so called location area LA.

When entering such a location area the mobile has to register itself. This requires the use of a dedicated control channel, e.g. in the GSM system, the so called stand alone dedicated control channel SDCCH. The present invention is, however, not limited to the stand alone dedicated control channel SDCCH but can be used whenever a dedicated control channel is to be converted from a traffic channel and converted back to a traffic channel.

Figure 2:
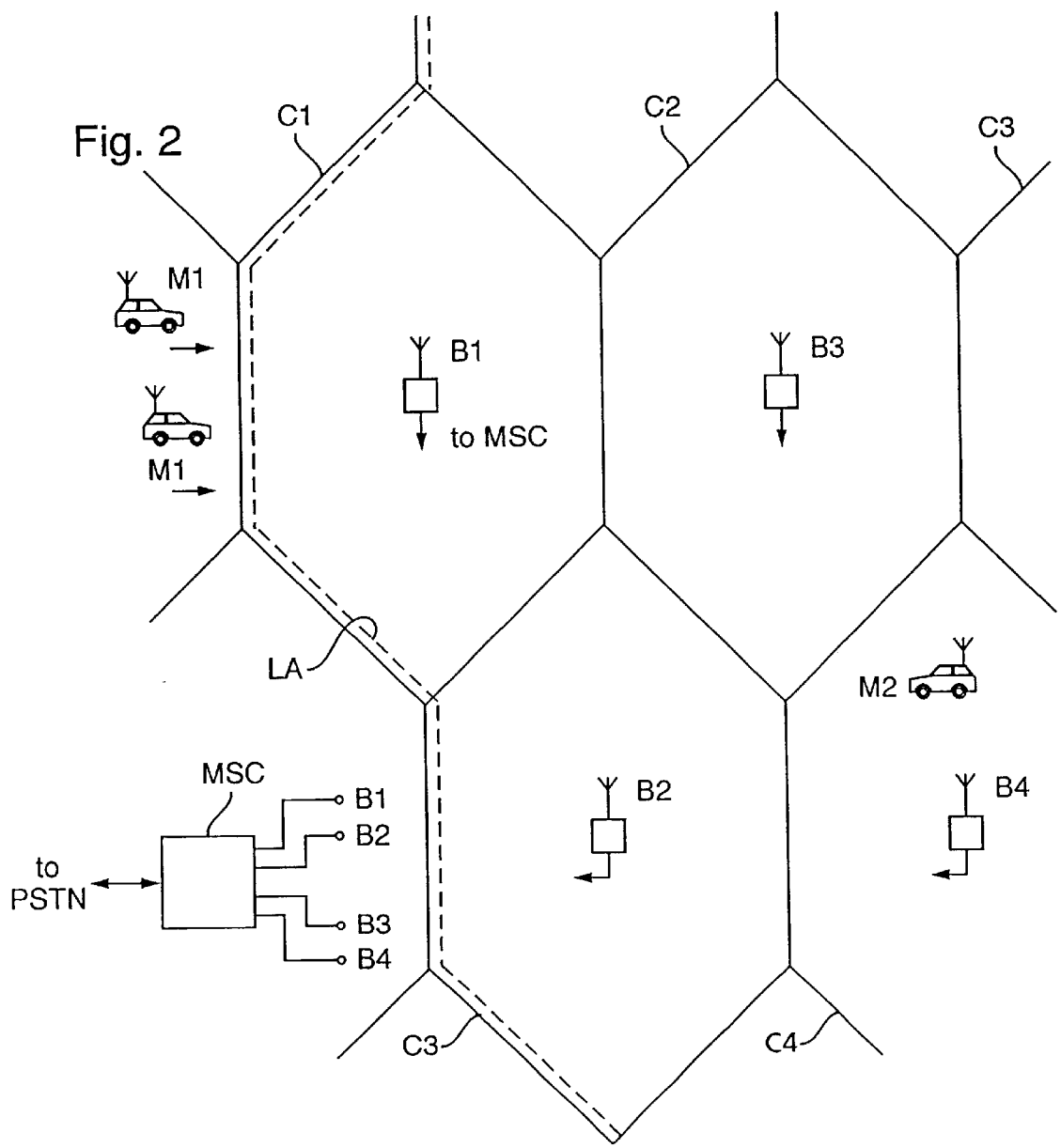
FIG. 2 shows an enlarged part of the diagram according to FIG. 1 including mobile stations and base stations.

FIG. 2 shows more in detail the cells of FIG. 1 and also the base stations B1–B4 serving the four cells C1,C2,C3 and C4. Cells C1 and C3 are situated along the border of the location area L shown in FIG. 1.

A mobile station M1 is outside the location area LA but is moving towards the cell C1 and thus has to register himself while entering the new location area. For that purpose a dedicated control channel has to be available.

Another mobile station M2 is registered in the location area LA and is moving in the cell C4 not in the neighborhood of border of the location area LA.

In a GSM-system, the stand alone dedicated control channel SDCCH is used by the mobile when it sends or receives an SMS ("Short Message Service") message. A call set-up aiming towards a regular speech or data call will in most cases also use a dedicated control channel as a signalling channel for a short time.

If a greater number of mobile stations are moving towards the border of location area LA it is important that a sufficient number of such control channels can be available in the border cells, in FIG. 2 the cells C1 and C3.

Operators need to configure every cell with the number of signalling channels that can be expected to be used. This is usually done based on experience about the traffic situation and the behaviour in the cell. The present invention will on a long term basis dimension a cell with the optimal number of signalling channels.

The present invention will be described primarily with reference to a GSM-system. As mentioned above the dedicated signalling channel used in such a system is the SDCCH. One time slot is able to carry 8 (or 4) SDCCH subchannels and is therefore referred to as an SDCCH/8 dedicated control channel which thus contains 8 subchannels. A subchannel (corresponding to a signalling channel) is here referred to as an SDCCH subchannel. The method according to the present invention is only valid for time slots carrying an SDCCH/8.

The inventive idea contains two parts.

One part is called the increase condition and implies the configuration of a traffic channel to a signalling channel by dynamically increase the number of signalling channels. In this example the signalling channel is a SDCCH/8.

The other part is called the decrease condition and implies the reconfiguration of an SDCCH/8 back to a traffic channel.

Embodiments of the inventive method will now be described.

Figure 3:
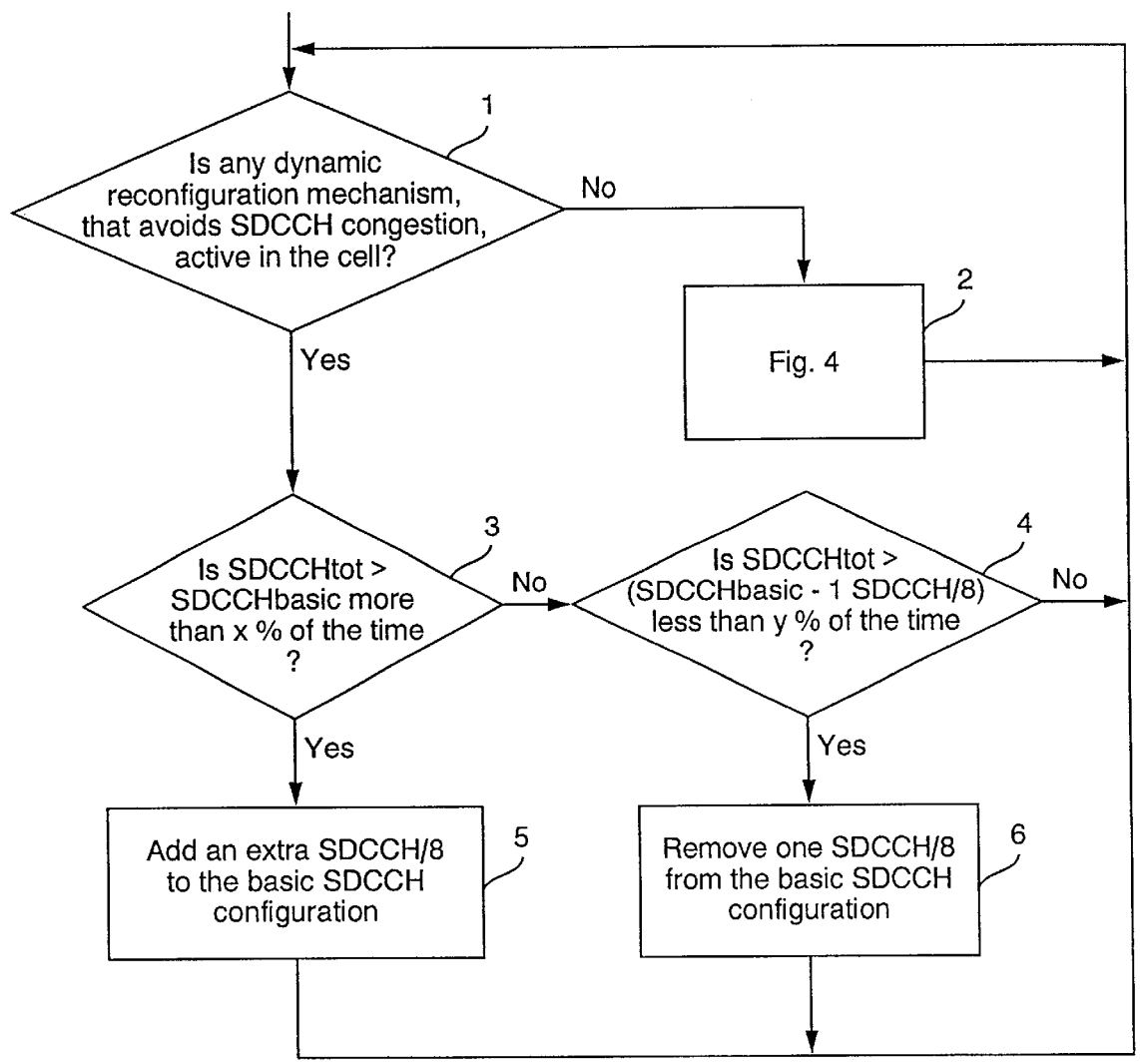
FIG. 3 shows a flow chart of one embodiment of the present invention.
Figure 4:
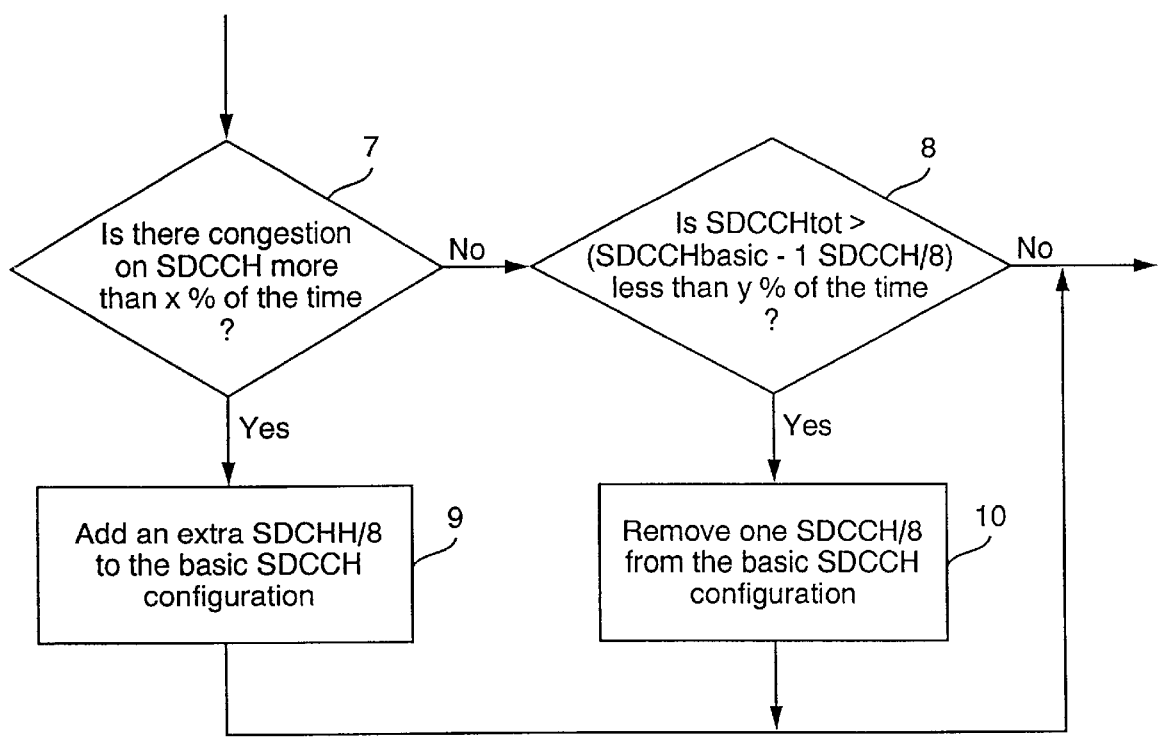
FIG. 4 shows a flow chart of one block included in the flow chart of FIG. 3.

Before describing the flowcharts according to FIGS. 3 and 4 definitions are to be made:

Basic configuration=a minimum number of signalling channels (SDCCH/8) to be defined in a cell.

SDCCHtot=Total number of allocated SDCCH subchannels;

SDCCHbasic=Total number of SDCCH subchannels of the basic configuration in the cell.

The condition SDCCHtot>SDCCHbasic is only possible due to the fact that the so called "fast loop" as described in the Swedish patent application 9703743-6 adds an extra SDCCH/8 in this case.

The present invention which is a "slow loop" method to reconfigurate a cell is intended to take care of the dimensioning of the dedicated control channels on a long term basis. It is based on a basic configuration. The number of signalling channels SDCCH/8 is increased or decreased depending on how the SDCCH subchannel utilization on a longer term (e.g. days) is. It is important to look at the busy hours for this loop as the basic configuration is changed.

The present method consists of two parts one increase and one decrease condition to automatically increase/decrease the number of SDCCH/8 in the basic configuration.

FIG. 3 is a flow chart of the method according to the present invention.

At first it is investigated whether a dynamic reconfiguration "fast loop" is active in the cell, block 1 in FIG. 3. If this is the case "Yes", it is investigated whether the total number of allocated channels SDCCH subchannels is greater than the number of the same channels in the basic configuration more than x % of the time. x is a parameter to be set by the operator and could be equal to 10%, indicating that the basic configuration is set too low.

If this is the case ("Yes" at block 3), an extra signalling channel SDCCH/8 is added to the basic configuration of subchannels (i.e. 8 new subchannels are added), block 5. This means that the mentioned "fast loop" will not remove the SDCCH/8 that have been added to the basic configuration even if the signalling traffic load is reduced in the cell. The result is thus that the number of unnecessary reconfigurations also are reduced.

If on the other hand it is investigated (block 3) that the total number of allocated SDCCH subchannels is less than the number of same channels in the basic configuration more than x % of the time, "No", it is investigated whether the number of subchannels is greater than the basic number of SDCCH subchannels minus eight SDCCH subchannels less than y % of the time. This later condition indicates that the basic configuration can be reduced with one SDCCH/8 in order to optimise the number of signalling channels to the signalling traffic load in the cell.

If this is the case ("Yes" at block 4), one signalling channel SDCCH/8 is removed from the basic configuration of SDCCH subchannels.

If a dynamic reconfiguration mechanism, e.g. according to the "fast loop" method described in the above mentioned Swedish patent application is not used ("No" at block 1 in FIG. 3) the algorithm according to FIG. 4 is started but is now based on the congestion on the dedicated control channels SDCCH. Accordingly (block 7 FIG. 4), it is investigated whether there is congestion more than x percent of the time, where "time" is defined as above.

If so ("Yes" at block 7), an extra signalling channel SDCCH/8 is added. If not ("No" at block 7), an investigation as that according to block 8 is done and the steps taken (block 8 if "Yes) are as those of block 4 and 6 in FIG. 3.

The basic configuration is thus increased with one SCCCH/8 if the channel utilization indicates that the basic configuration would have given a congestion level of more than e.g. x=2% on the SDCCH subchannels if the fast loop had not been used (block 1 "No" in FIG. 3; blocks 7,9 FIG. 4).

The basic configuration is decreased with one SDCCH/8 if the channel utilization indicates that the basic configuration would have given a congestion level of less than e.g. y=0,5% on the SDCCH subchannels if one SDCCH/8 would have been taken away from the basic configuration (block 1 "No" FIG. 3; blocks 7,8,10 FIG. 4).

The dynamic dimensioning of SDCCH subchannels prevents congestion of SDCCH subchannels. At the same time it prevents overdimensioning of SDCCH subchannels which implies that the operator always has the optimum number of channels of different types defined in each cell.

By the "slow loop" method according to the present invention, the number of reconfigurations are reduced if a "fast loop" also is used.

What is claimed is:

1. A method of reconfigurating a cell in a cellular mobile radio system in order to avoid congestion by converting a traffic channel to a dedicated control channel or vice versa, wherein each cell includes a basic number of allocated control channels and a number of traffic channels and where no dynamic reconfiguration on a short term basis is made, comprising the steps of:

a) investigating whether the total number of allocated control channels in a cell exceeds a basic number of such channels in the cell;

b) if so, adding an extra control channel to the basic number of such channels; while if not c) investigating whether the total number of allocated control channels exceeds a reduced number of said basic number of allocated control channels, and if so d) removing at least one of said dedicated control channels from said basic configuration.

2. Method as claimed in claim 1, in which the condition according to step a) is valid during a certain percentage of the time.

3. Method as claimed in claim 1, in which the condition according to step c) is valid during a certain percentage of the time.

4. A method of reconfiguring a cell in a cellular mobile radio system in order to avoid congestion by converting a traffic channel to a dedicated control channel or vice versa, wherein each dedicated control channel includes number of allocated control channels and wherein each cell includes a basic number of allocated control channels and a number of traffic channels (TCH) and where no dynamic reconfiguration on a short term basis is made, comprising the steps of:

a) investigating whether there is congestion on allocated control channels more than a determined percentage of a certain time, and if so b) adding an extra dedicated control channel to the basic configuration of allocated control channel while if not, c) investigating whether the total number of allocated control channels is greater than a reduced number of the basic number of allocated control channels for a certain percentage of said time, and if so d) removing one of said dedicated control channels from the basic configuration of allocated control channels.

5. A method of reconfiguring a cell in a cellular mobile radio system in order to avoid congestion when converting a traffic channel to a dedicated control channel or vice versa, wherein each dedicated control channel includes a number of allocated control channels and wherein each cell includes a basic number of such allocated control channels and a number of traffic channels and where a dynamic reconfiguration of the allocated control channels on a short term basis is made, comprising the steps of:

a) investigating whether the total number of allocated control channels in a cell exceeds a basic number of such allocated channels in the cell during a certain percentage of a certain time and if so;

b) adding an extra dedicated control channel to the basic number of such allocated channels; while if not, c) investigating whether the total number of allocated control channels exceeds a reduced number of said basic number of allocated control channels during a certain percentage of said time and if so, d) removing one of said dedicated control channels from said basic number of allocated control channels.

* * * * *